United States Patent
Elworthy

(10) Patent No.: US 7,389,224 B1
(45) Date of Patent: Jun. 17, 2008

(54) NATURAL LANGUAGE SEARCH METHOD AND APPARATUS, INCLUDING LINGUISTICALLY-MATCHING CONTEXT DATA

(75) Inventor: David Elworthy, Cambridge (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/511,447

(22) Filed: Feb. 23, 2000

(30) Foreign Application Priority Data

Mar. 1, 1999 (GB) ................................ 9904662.5

(51) Int. Cl.
*G06F 17/27* (2006.01)
(52) U.S. Cl. ................................. 704/9; 707/3; 707/6
(58) Field of Classification Search ................ 704/1, 704/9–10; 707/1–5, 6, 530, 531, 102
See application file for complete search history.

(56) References Cited

U.S. PATENT DOCUMENTS

| | | | | |
|---|---|---|---|---|
| 5,062,074 A | * | 10/1991 | Kleinberger ................... | 707/5 |
| 5,278,980 A | * | 1/1994 | Pedersen et al. ............... | 707/3 |
| 5,933,822 A | * | 8/1999 | Braden-Harder et al. ...... | 707/5 |
| 6,018,733 A | * | 1/2000 | Kirsch et al. .................. | 707/3 |
| 6,026,388 A | * | 2/2000 | Liddy et al. .................... | 707/1 |
| 6,076,088 A | * | 6/2000 | Paik et al. ...................... | 707/5 |
| 6,144,958 A | * | 11/2000 | Ortega et al. .................. | 707/5 |
| 6,169,986 B1 | * | 1/2001 | Bowman et al. ............... | 707/5 |
| 6,182,029 B1 | * | 1/2001 | Friedman ........................ | 704/9 |
| 6,240,408 B1 | * | 5/2001 | Kaufman ........................ | 707/3 |
| 6,246,977 B1 | * | 6/2001 | Messerly et al. .............. | 704/9 |
| 6,411,924 B1 | * | 6/2002 | de Hita et al. ................. | 704/9 |

FOREIGN PATENT DOCUMENTS

| | | |
|---|---|---|
| EP | 0 737 928 A1 | 10/1996 |
| GB | 2 269 923 B | 2/1994 |

OTHER PUBLICATIONS

S. Flank, "A Layered Approach to NLP-Based Information Retrieval" (Proceedings of the 36 Annual Meeting of the Association of Computational Linguistics, pp. 397-403, 1998).

(Continued)

*Primary Examiner*—Patrick N. Edouard
*Assistant Examiner*—Lamont Spooner
(74) *Attorney, Agent, or Firm*—Fitzpatrick, Cella, Harper & Scinto

(57) ABSTRACT

A method and apparatus for performing a search for information containing natural language is disclosed which uses a natural language query. The query is input in the form of units of the natural language and this is matched with units in the natural language of the data. Where there are unmatched units in the query and/or the data, context data in the form of one or more unmatched units of the query and/or the data is generated. Each unmatched unit as a predefined linguistic relationship to one of the or each matched unit. Output data is formed as matched units with any respective context data.

11 Claims, 6 Drawing Sheets

OTHER PUBLICATIONS

J. Fagan, "Experiments in Automatic Phrase Indexing for Document Retrieval: A Comparison of Syntactic and Non-Syntactic Mehotds" (PhD Thesis Cornell University, Technical Report TR 87-868; 1987).

C. Schwartz, "Automatic Syntactic Analysis of Free Text" (General American Society for Information Science, Sep. 1990, pp. 408 to 417).

T. Järvinen and P. Tapanainen, "A Dependency Parser for English" (Technical Report No. TR-1, Department of General Linguistics, University of Helsinki, Mar. 1997).

P. Tapanainen and T. Järvinen, "A Non-Projective Dependency Parser" (Proceedings of the 5th Conference on Applied Natural Language Processing, Washington, DC, Apr. 1997, Association for Computational Linguistics).

* cited by examiner

NATURAL LANGUAGE SEARCH METHOD AND APPARATUS, INCLUDING LINGUISTICALLY-MATCHING CONTEXT DATA

The present invention generally relates to a method and apparatus for performing a search for information containing natural language using a natural language query. The present invention particularly relates to such a method and apparatus for providing context information for the best matches to the natural language query.

Most information retrieval systems are quite good at finding information but poor in presenting the results to users. Typically the results are presented as a simple list of documents or document headers, sometimes with a relevance score. A few web search engines attempt to improve on this by, for example, grouping pages from the same site together. It is difficult for users to make effective use of results lists, because the results list does not show how documents are related to one another and to the original query.

Information retrieval systems can retrieve information using linguistic queries in several ways. The simplest and most common is the use of key words. Key words can be combined using Boolean logic or statistical techniques to form a query. It is also known from an article by S Flank entitled "A Layered Approach to NLP-Based Information Retrieval" (Proceedings of the 36 Annual Meeting of the Association of Computational Linguistics, page 397, 1998), the content of which is hereby incorporated by reference, that a natural language input can be translated to a search engine specific Boolean logic query. Such a technique, however does not benefit from the syntactic information which is available in a natural language query. Such information can only be utilised by exploiting the structure of the query and the information by some form of parsing.

The retrieval of information using syntactic information from natural language queries has been achieved in many prior art systems. A system described in J Fagans PhD Thesis entitled "Experiments in Automatic Phrase Indexing for Document Retrieval: A Comparison of Syntactic and Non-Syntactic Methods" (PhD Thesis Cornell University, Technical Report TR 87-868), the content of which is hereby incorporated by reference, uses augmented phrase structure rules to selectively extract phrases from parse trees generated by an automatic syntactic analyser.

Natural language processing based information retrieval is also described in the paper by Flank referenced above. The technique described in this paper uses noun phrase syntax analysis.

Another method of retrieving information is disclosed in an article by C Schwartz entitled "Automatic Syntactic Analysis of Free Text" (General American Society For Information Science, September 1990, pages 408 to 417) the content of which is hereby incorporated by reference. In the technique disclosed by Schwartz, noun phrases are identified in the natural language passages in the query and in the information and they are selected for parsing. The parsed noun phrases are normalised so that the meaning representation structure is fitted to standard or common dependency structures. Noun phrase matching then takes place by a straightforward comparison of the normalised meaning representation structures in order to identify identical paths and nodes.

Whilst the use of syntactic information from natural language queries in the retrieval of information can provide a more accurate searching technique, it does nothing to overcome the problem of how to present the results of the search. The results of the search are merely the best match or matches to the query with no information on how the documents are related to one another or to the original query.

It is an object of the present invention to address this problem by using syntactic information to give the results of the search in context.

In accordance with an aspect of the present invention there is provided a search engine for searching for data in the form of units of a natural language. An input query is matched to a plurality of available sets of information to identify the best matches and to identify which words in the query and in the sets of information match. For a number of the best matches the unmatched units in the query and/or the sets of information are used to form context data. The context data comprises one or more unmatched units of the query and/or the sets of information each of which has a predefined syntactic relationship to one of the matched units. The data output thus comprises the matched units and the unmatched units which have a linguistic relationship to the matched units. This additional context information enables the user of the search engine to not merely identify what is matched but also the context in which it matched. This provides far richer information enabling a user to understand the results of the search far more easily.

In the context of the present invention natural language data comprises a series of units of a natural language which have linguistic relationships therebetween.

The matching technique can comprise a simple keyword matching technique. This has the benefit of simplicity but does not benefit from the syntactic information available to improve the matching process. If keyword searching is used, the syntactic information used for forming the context data can be determined by a parsing operation either before or after the matching process.

In order to make use of the syntactic information available in the input query and in the sets of information, preferably, the query and the sets of information are parsed and the matching takes into account the syntactic structure of the query and the sets of information in order to determine the match.

The level of syntactic information used in the matching can be simple related pairs of words such as used in the work by Flank and Fagan as referenced hereinabove, or even a full set of semantic relationships between the words as described in the applicants co-pending U.S. patent application Ser. No. 09/400,872 filed on 22 Sep. 1999, the content of which is hereby incorporated by reference.

In order to obtain the syntactic information, the parser used can be of any form. For example, the dependency parsers disclosed in GB-A-2269923, EP-A-0737928, a paper by T Järvinen and P Tapanainen entitled "A Dependency Parser for English" (Technical Report No. TR-1, Department of General Linguistics, University of Helsinki, March 1997), and a paper by P Tapanainen and T Järvinen entitled "A Non-Projective Dependency Parser" (Proceedings of the 5th Conference on Applied Natural Language Processing, Washington D.C., April 1997, Association for Computational Linguistics). The contents of all of these documents is hereby incorporated by reference. A dependency parser parses the natural language to generate meaning data which comprises meaning representations for the words and links between them. The links indicate which meaning representation modifies the meaning of other meaning representations and the links and type of links are determined with regard to the grammar of the natural language.

An embodiment of the present invention uses the output of a finite state parser implementing a dependency parser technique as described in co-pending application entitled: "Apparatus and Method for Generating Processor Usable Data from Natural Language Input Data" filed herewith by the present applicants and claiming priority from United Kingdom Patent Application No. 9904663.3 filed on 1 Mar. 1999, the content of which is hereby incorporated by reference.

The searching technique is applicable to the retrieval of information of many different types. For example, the natural language query can be used to retrieve document data. In this case, either the natural language query can be compared directly with the contents of the document, or it can be compared with an abstract of the document in order to perform the matching operation. The searching technique is also applicable to retrieval of non-text data. Such data requires a natural language caption in the form of meta data. For example, in order to retrieve images from an image database, where images are given captions which describe the content of the images, a natural language query can be used in order to search the database to obtain a best match or matches to data in the database.

The context data of the present invention comprises one or more unmatched units each of which has a predefined linguistic relationship to one of the matched units. In one embodiment this relationship comprises the modification relationship between the units. This information is obtained from a dependency parser. The generation of the context data in this embodiment is achieved in accordance with one or more rules which define contextually important modification relationships between matched and unmatched units. Thus the rules define the sort of context information which is to be output.

More generally, in an embodiment the context data of the present invention is generated using one or more rules which contain syntactic and semantic constraints for the formation of the context data.

In an embodiment of the present invention, the generated context data is not just output, but is used to structure the results of the search. The search result is thus the sets of information, which comprise the best matches to the input query, ordered in accordance with the context data. This ordering can take the form of a hierarchical arrangement of indexes wherein the indexes are layered in accordance with the syntactic relationships. The indexes comprise the matched and unmatched words of the context data. This embodiment enables a user to more easily grasp the significance and relationships between the matches obtained from the search.

The present invention also provides an enhanced data retrieval system since the desired data obtained as best matches to the input query is output together with this associated context information to enable a user to identify why the search has found that particular piece of data.

The present invention can be implemented by software operating on a multi-purpose computer. The present invention is thus embodied by a computer program provided on a storage media such as a floppy disk, optical disk, magnetic tape, or programmable memory device. Further, since the computer program can be transmitted over a network such as the Internet, the present invention can be embodied as a signal carrying the computer code.

Embodiments of the present invention will now be described with reference to the accompanying drawings, in which.

A first embodiment of the present invention will now be described with reference to FIGS. 1 to 5.

Figure 1:
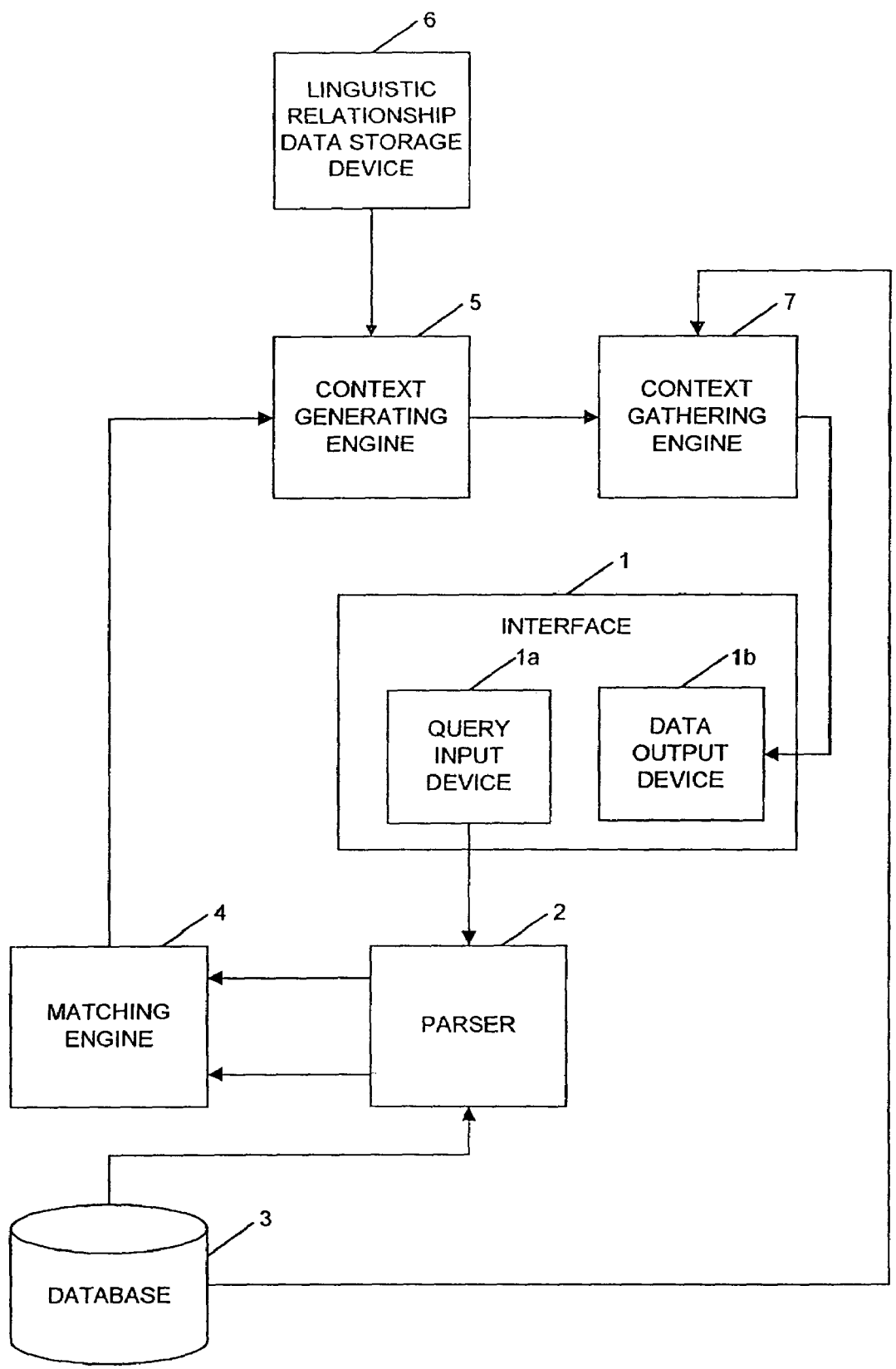
FIG. 1 is a functional diagram of an embodiment of the present invention.

FIG. 1 is a diagram illustrating the functional units of an embodiment of the present invention. An interface 1 is provided for a user to input data and to receive output data including context data. This interface includes a device 1a for allowing the user to enter a query. The interface 1 also includes an output device 1b for outputting the search data and the context data enabling a user to more readily understand the relationship between the query and the retrieved data and the relationships between the retrieved data.

A parser 2 is provided for receiving the input query from the query input device 1a to generate semantic and syntactic information. The parser 2 also parses information from a database 3 which is to be searched. The parser 2 thus generates two sets of parsed data which is passed to a matching engine 4 to match the parsed data. The matching engine 4 in this embodiment performs matching using both semantic and syntactic information from the parser 2. The use of the semantic and syntactic information provides a more accurate matching technique.

A context generating engine 5 receives data from the matching engine 4 and also receives linguistic relationship data from a storage device 6. A context generating engine 5 generates context data for the matched data in accordance with the linguistic relationship data. A context gathering engine 7 receives the context data and uses this to generate a hierarchical index structure. This structure is used to organise the data retrieved from the database 3 so that it is ordered in accordance with the context data. The best match data, ordered in accordance with the context data, is then passed to the data output device 1b for presentation to the user.

Figure 2:
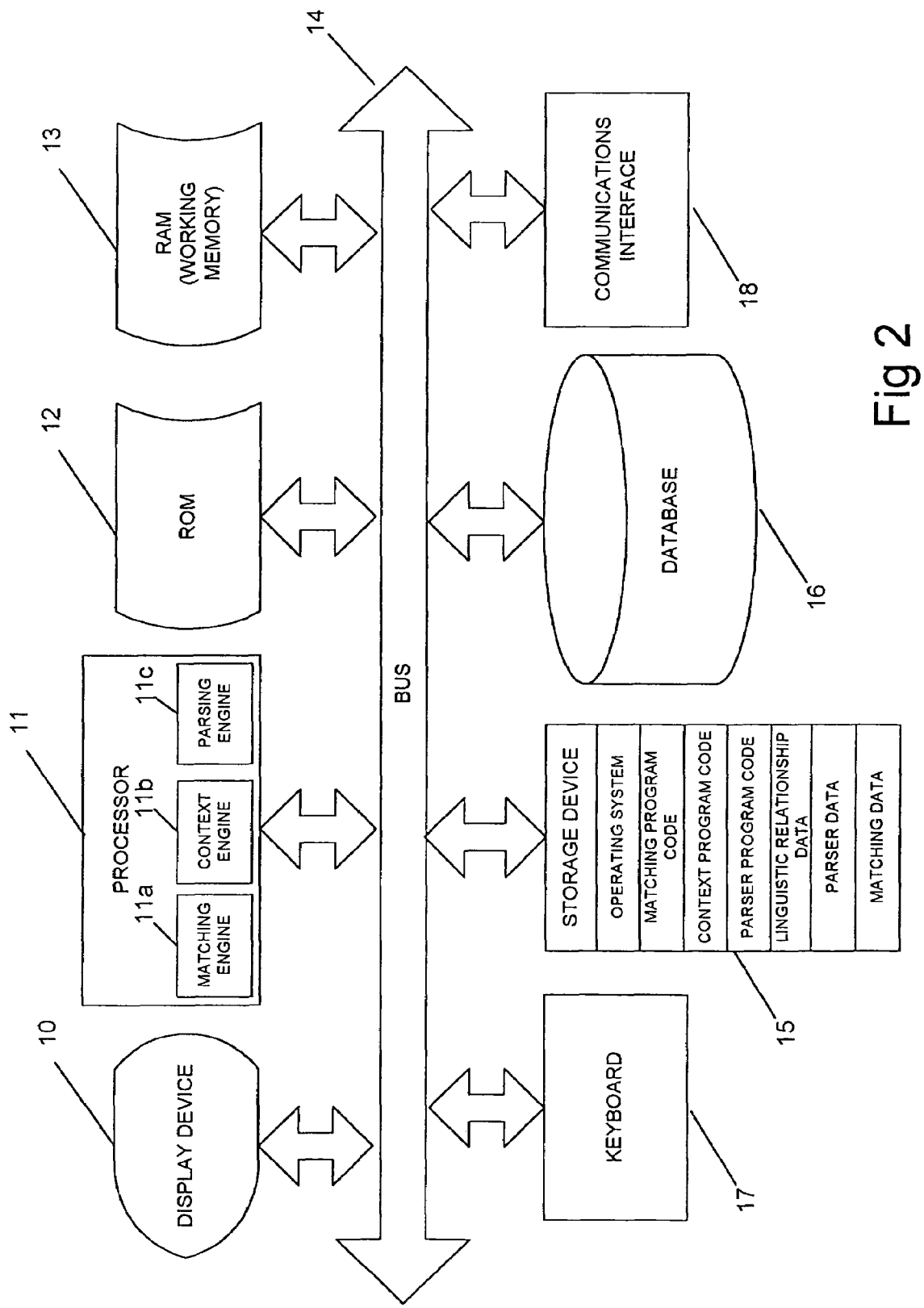
FIG. 2 is a schematic diagram of an embodiment of the present invention.

FIG. 2 illustrates schematically an embodiment of the present invention comprising a multi-purpose computer programmed to implement the present invention. The various components of the computer are illustrated linked by the computer bus 14. A display device 10 is provided for outputting the search results and the context data. A processor 11 is provided and this implements software to perform the function of the matching engine 11a, the context data generating and gathering engine 11b and the parser 11c illustrates as functions in FIG. 1. A read-only memory device (ROM) 12 is provided and comprises the Bios of the computer. A working memory comprising random access memory (RAM) 13, is provided for use by the processor during the implementation of the programs. A keyboard 17 is provided to allow the input of the query by the user. A storage device 15 such as a hard disk drive is provided for storing computer programs and data. The computer programs comprise the operating system for the computer, the parser program code for causing the processor 11 to implement the parser 11c, the matching program code for causing the processor 11 to implement the matching engine 11a, and the context generating and gathering program code for causing the processor to implement the context data generating and gathering engine 11*b*. The data stored in the storage device 15 comprises the parser data required by the parser program for the implementation of the parser 11*c*, matching data for use by the matching program to implement the matching engine 11*a*, and linguistic relationship data for use by the context data generating and gathering program to implement the context data generating and gathering engine 11*b*.

The database 16 is also provided and comprises the database 3 of FIG. 1. This database contains the sets of data to be found by the search.

A communication interface 18 is provided for interfacing the computer to a network such as a local area network or the internet. Thus although in this embodiment the database 16 is shown as being within the computer, the database can be remote and accessible over the network.

Figure 3:
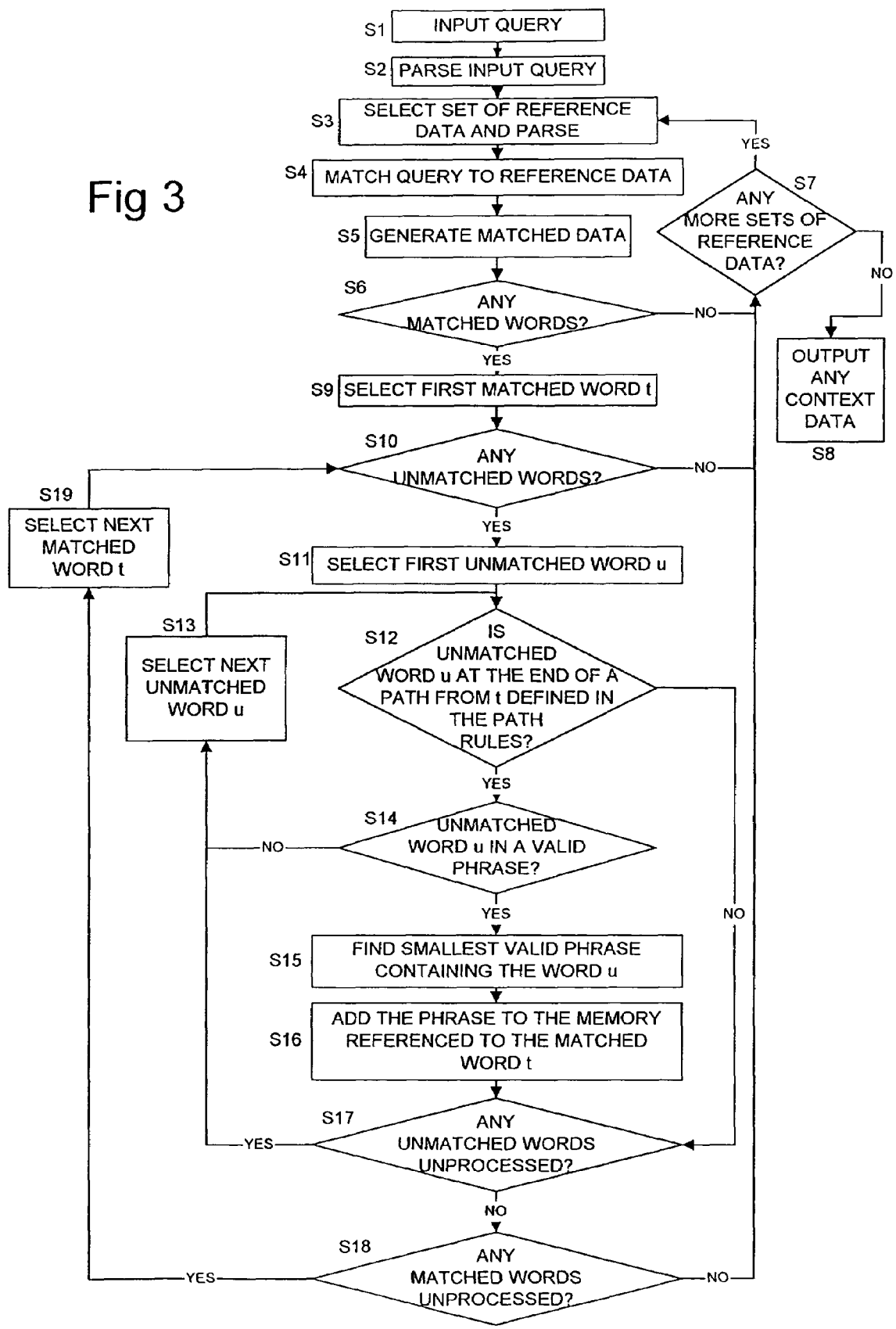
FIG. 3 is a flow diagram illustrating the operation of an embodiment of the present invention.

The general operation of this embodiment of the present invention will now be described with reference to FIG. 3.

In step S1 the user inputs a natural language query. This input query is then parsed in step S2. In step S3 a set of reference data in the database to be searched is selected and parsed. The parser in this embodiment comprises a finite state parser carrying out a dependency parsing operation. Finite state parsers in general are well known and the specifics of the implementation are not important for a description of the invention. The specific implementation is disclosed in the above referenced co-pending application entitled: "Apparatus and Method for Generating Processor Usuable Data from Natural Language Input Data" filed herewith.

The parsed query and set of reference data then undergo matching in step S4 to identify the matched linguistic units. A linguistic unit can comprise any lexical unit such as a word or multi-words such as "the white house". The matching process carried out is in accordance with the process described in the applicants earlier U.S. application Ser. No. 09/400,872.

In step S6 it is determined whether there are any words which match as a result of the matching step. If not, in step S7 because there are no matched words between the query in the set of reference data it is then determined if there are more sets of reference data to be matched. If so the process returns to step S3, otherwise the process terminates in step S8 with the output of any context data stored in the memory.

The data generated as a result of the matching operation and using the finite state parser is data indicating a sequence of words, their parts of speech, a phrase bracketing structure, and the dependency relationships.

In step S9 a first matched word t in the set of matched words T is selected. It is then determined in step S10 whether there are any unmatched words in the set of reference data. If not, the process proceeds to step S7 because there is no context information which can be generated for the set of reference data. Thus, the input query matched the set of reference data. If however, there are unmatched words indicating that the set of reference data contains additional information not requested in the query, in step S11 the first unmatched word u in the set of unmatched words U is selected. It is then determined whether the unmatched word u is at the end of a modification path from the matched word t. The paths are defined in path rules. The path rules define the lexical part of speech for the matched word, a valid path description from the matched word to the unmatched word and the phrasal category or lexical part of speech for the unmatched word. If it is determined that the matched word t and the unmatched word u are not linked in accordance with the path rules, it is determined in step S17 whether there are any unmatched words left unprocessed. If there are in step S13 the next unmatched word u is selected and the process returns to step S12. If not, in step S18 it is determined whether there are any matched words which are unprocessed. If not, the process returns to step S7 since the algorithm has processed all matched and unmatched words for the set of reference data. If there are still matched words to process in step S19 the next matched word t is selected and the process returns to step S10.

If in step S12 it is determined that the unmatched word u is at the end of a path from a matched word t as defined in the path rules, in step S14 it is determined whether the unmatched word u is present in a valid phrase defined in the valid phrase rule. If there is no valid phrase, in step S13 the next unmatched word u is selected and the process returns to step S12. If a valid phrase is identified the smallest valid phrase containing the word u is determined in step S15 and in step S16 the phrase is added to the memory referenced to the matched word t. The memory thus stores the context data as unmatched words or phrases reference or linked to the respective matched words.

The valid phrase can comprise a part of speech for a word, or a phrasal category for a group of words. In step S17 it is then determined whether there are any unmatched words still left unprocessed and if so the process returns to step S13 to select the next unmatched word. If not in step S18 it is determined whether there are any matched words left unprocessed. If not the process returns to in step S7 since the unmatched and matched words have been processed for the set of reference data. If there are still matched words to be processed, in step S19 the next matched words t is selected and the process returns to step S10.

Once a query has been input and parsed, the parsing, matching and context generation steps will be repeated for each set of reference data.

The operation of steps S9 to S19 will now be described in more detail with reference to an example.

The output of the matching process using the finite state parsing technique is a phrase represented as a sequence of words with their parts of speech, a phrase bracketing structure, and the dependency relationships. Hereinafter the part of speech (pos) is given by following each word with "_POS". The phrase bracketing for a phrase type PT is given as "[ . . . ]PT". In addition words in the sets of reference data which match words in the query are marked in BOLD.

For the query:

"camera with a lens"

and the reference data:

"black SLR camera with a zoom lens on a white surface" the data output from the matching engine is:

[[black_adj SLR_noun camera_noun]NG,

[with_prep a_det zoom_noun lens_noun]PP,

[on_prep a_det white_adj surface_noun]PP]NP mod[camera]=black mod[camera]=SLR pmod[camera]=with pmod[camera]=on mod[with]=lens mod[lens]=zoom mod[on]=surface mod[surface]=white In the notation given hereinabove, the parts of speech are:
adj—adjective
noun—noun
prep—preposition
det—determiner
The phrase types are:
NG—noun group
PP—prepositional phrase
NP—noun phrase The dependency relationships are given as indexed variables as generated by the finite state parser described in co-pending application entitled: "Apparatus and Method for Generating Processor Usuable Data from Natural Language Input Data" filed herewith. Thus mod[camera]=black defines that the modifier of the word "camera" is the word "black". A prepositional modifier (pmod) of the word "camera" is the word "on".

Figure 4:
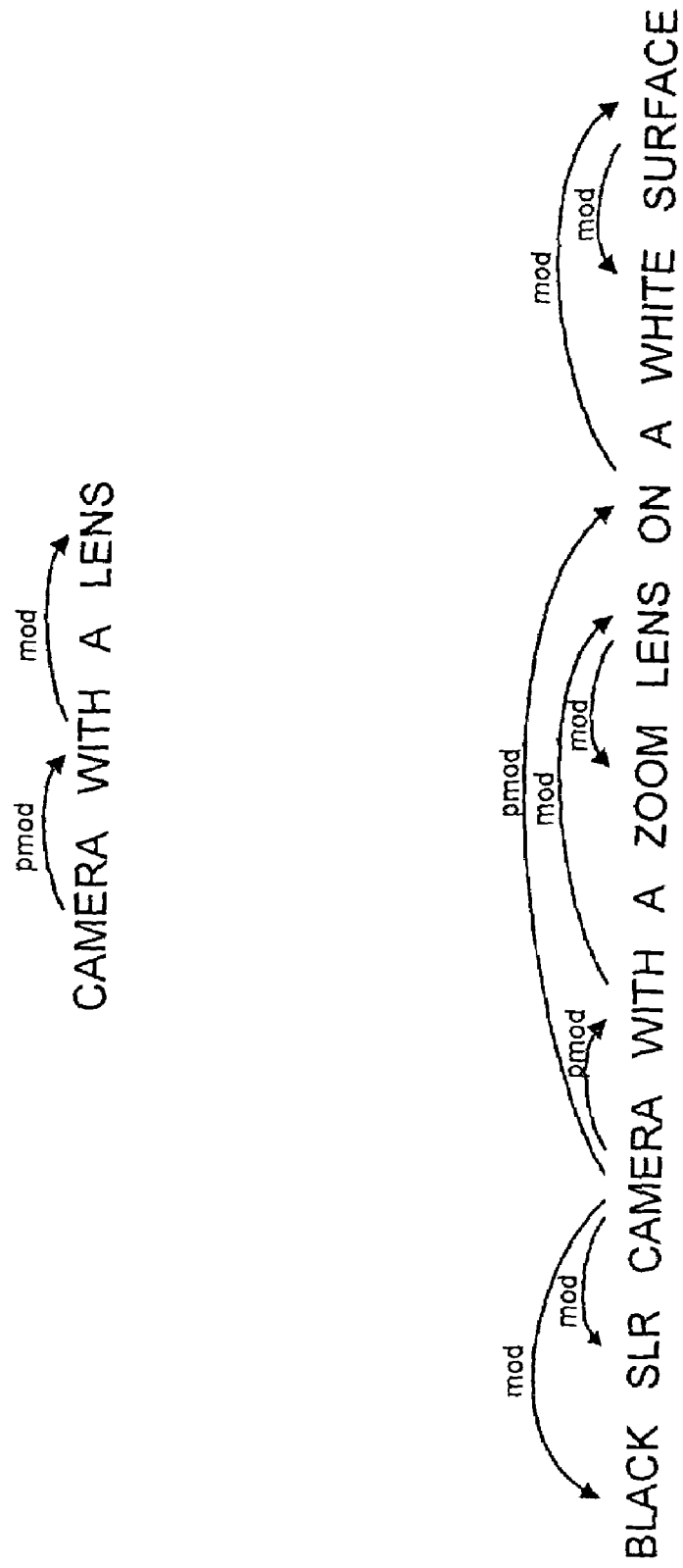
FIG. 4 illustrates the syntactic information used in the generation of the context data.

FIG. 4 illustrates the modification relationships i.e. paths for the query and the reference data set.

Hereinafter a path is referred to and comprises a modification relationship between two words. For example, a path from the word "camera" to the word "black" is given by a simple modification relationship i.e. mod. The path from the "camera" to the word "surface" is given by two consecutive paths pmod and mod via the word "on".

The algorithm uses path rules as mentioned hereinabove. Each path rule has the form $<r_t,r_p,r_c>$, where $r_t$ is a lexical part of speech for the matched word,
$r_p$ is a path description as described hereinabove, and
$r_c$ is a phrasal category or a lexical part of speech for the unmatched word.

Any one of these can be defined by a wildcard *. This means that the rule allows any value to be used e.g. any lexical part of speech, any path, or any phrasal category.

The path descriptions take the form of a list of variable names e.g. mod or pmod:mod.

In the algorithm three tests are performed each test results in a Boolean result.

has_pos(t,c)
  t is a matched word and c is a part of speech. has_pos(t,c) is true if either t has the part of speech c or if c is a wildcard *.

on_path(t,u,p)
  t is a matched word, u is an unmatched word, and p is a path description.
  on_path(t,u,p) is true if either p is a * or there is an unmatched path of type p from t to u i.e. the relationships in the path p are followed to get from t to U. This can be expressed recursively as follows. If p consists of a single element, then on_path(t,u,p) is true if and only if u is a member of p[t]. If p is a list of variable names, of which the first is q and the rest of the list is r, then on_path(t,u,q:r) is true if and only if there is some word w which is a member of q[t] such that w is not marked as matched and on_path(w,u,r) is true. The reason for saying "is a member of" here is that an indexed variable can have several words stored in it, as in example of pmod[camera]={with,on} illustrated above.

Valid-Phrase (C,p,u)
  p is a lexical part of speech or a phrasal category. u is an unmatched word. C is a phrase or word. valid phrase (C,p,u) is true if C has a category or part of speech p and u occurs in C.

The Main Algorithm
The main algorithm implemented by steps S7 to S17 can be written in pseudo code as follows:
Let S be the set of contexts, initially empty (output).
Let P be the set of path rules (input).
Let T be the set of current words, initialised to all matched words (input).
Let U be the set of available words, initialised to all unmatched words (input).
while T is not empty
{
select a word t from T
for each word u in U
(
if there is a path rule $<r_t,r_p,r_c>$ in P such that
    has_pos(t,$r_t$)
    AND on_path(t,u,$r_p$)
then
    find the smallest phrase C such that valid_phrase (C, $r_c$,u)
    if there is such a C then
        add the context <t,C> to S
        remove u from U
}
remove t from T
}

By "smallest phrase" what is meant is that if there is a valid phrase C and valid phrase D, and C is entirely contained within D, then the C is used.

The operation of the algorithm will now be illustrated with reference to the example described hereinabove and illustrated in FIG. 4.

The initial set T={camera,lens}
The initial set U={black,SLR,zoom,white,surface, with, on,a}.
The path rules to be used are:
1. <*,mod,*> (this finds modifiers)
2. <*$_1$ pmod:mod,PP> (this finds prepositional phrases (PPs))
With the first matched word t="camera", and in the first unmatched word u="black" the first rule applies because:
  has_pos(camera,*)=TRUE
  on_path(camera,black,mod)=TRUE
We can find a suitable phrase (actually a single word) C=[black]adj so the context data <camera,[black]adj> is added to the set S.

With the second unmatched word u="SLR" rule 1 applies for the same reason as given above and thus the context data <camera,[SLR]noun> is added to the context data set S.

The only other word in the set U which complies with the path rules is the word "surface". When u="surface" rule 2 applies because:
  has_pos(camera,*)=TRUE
  on_path(camera,surface,pmod:mod)=TRUE
A suitable phrase C=[on a white surface]PP can be found, and so the context data <camera,[on a white surface]PP> is added to the context data set S.

All of the unmatched words for the matched word t="camera" have thus been processed.

The next matched word t="lens" is then selected. The only word for which the path rules apply is the word u="zoom". Rule 1 applies because:
  has_pos(lens,*)=TRUE
  on_path(lens,zoom,mod)=TRUE
A suitable phrase (actually a single word) is C=[zoom] noun, so the context data <lens,[zoom]noun> is added to the context data set S.

The result of the algorithm is thus a set S of context data. Each entry in the set comprises a matched word and an unmatched word or phrase linguistically related to the matched word. This data can be output to a user to enable them to identify where the input query matches the set of data and the context of each of the matched words.

When searching for data, it is most useful to use a query which results in a number of best matches being returned. It is thus desirable to use the context information to order the best matches in order to enable a user to see how the sets of reference data are related to one another and to the query. The context data generated as described hereinabove can be used to achieve this by gathering the contexts.

The method of gathering the context data together to structure the search result will now be described.

For each set of reference data the context data comprises a set of context in the form of a governor word and a context phrase. In the example given above the context data comprises:

<camera,[black]adj>
<camera,[SLR]noun>
<camera,[on a white surface]PP>
<lens,[zoom]noun>

As can be seen above, there can be more than one context phrase for a governor word. In the above example, "camera" has three context phrases.

In order to provide structure to the output context data, additional information is used to context data. It is necessary to have knowledge of the head word in the query i.e. the word which does not modify any other word. Also, it is necessary to know the modification relationships between the matched (governor) words. For example, it can be seen in FIG. 4 that the word "camera" is the head of the input query since it does not modify any other word. The matched word "lens" is the next matched word (in this example it is in fact the only other matched word) in the modification chain from the head word.

In addition to this information, a list of path levels is used in order to define the structuring of the output and to define the contexts which are of interest. The paths include an empty path which defines a matched (governor) word. Other paths such as mod and pmod define the modification path from the matched word to an unmatched word. The path can comprise a linked path such as pmod:mod.

A method of forming the structure output will now be described with reference to FIG. 5 and an example of data sets.

Figure 5:
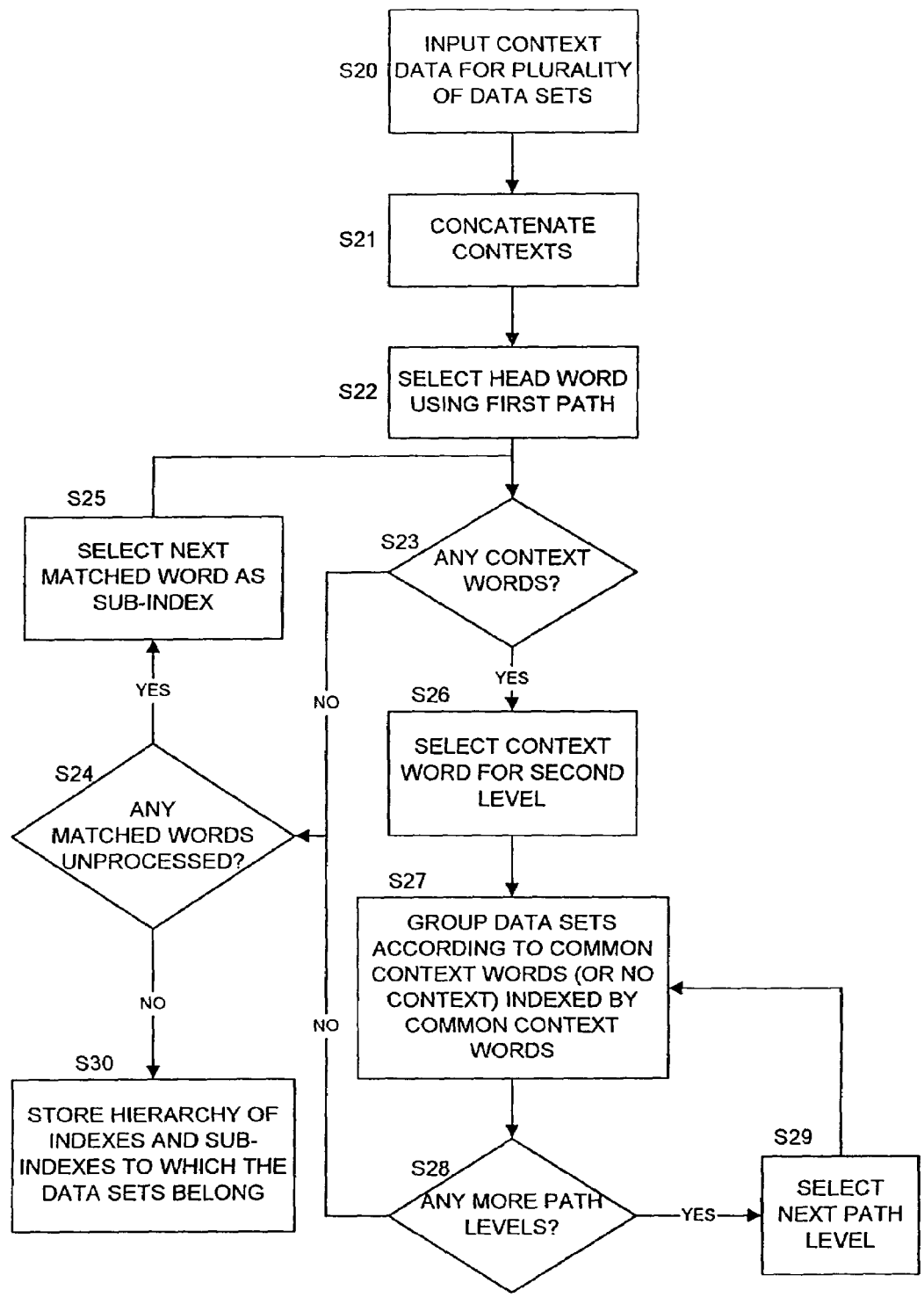
FIG. 5 is a flow diagram illustrating the use of the context data for the ordering of the results of a search in accordance with an embodiment of the present invention.

In step S20 of FIG. 5 the context data for a plurality of data sets is input. For the query:

"camera with a lens"

The data sets which match are listed below together with their context data. In the context data { } means that there is no context data. Paths between the matched and unmatched words are also given in the context data below and are given in [ . . . ].

camera with a lens
{ }
Large camera with a lens
<camera [mod], large>
camera with a lens on a table
<camera [pmod:mod], [on a table]PP>
Large camera with a zoom lens
<camera [mod], large>
<lens [mod],zoom>
camera on a table with a long zoom lens
<camera [pmod:mod], [on a table]PP>
<lens [mod],zoom>
<lens [mod],long>

In step S21 of FIG. 5 for each matched (governor) word the context data is concatenated so that there is a single context data for a particular matched word and a particular path. In the example given above, the concatenation of the last example results in:

camera on a table with a long zoom lens
<camera [pmod:mod],[on a table]PP>
<lens [mod], long & zoom>

In the process of this example the following path list is used:

[ ]
[mod], [pmod:mod]

[ ] indicates an empty path and is used to identify a matched (governor) word. This path is at the first level. The paths [mod] and [pmod:mod] are both at the second level.

Using the path list and knowledge of the head of the input query, the head word is selected in step S22 of FIG. 5. In step S23 is then determined whether there are any context words. If there are not, in step S24 the process then determines whether there are any further matched words which have not been processed. If not, in step S30 the process terminates by storing any indexes and sub-indexes which have been determined. If there are further matched words to be processed, in step S25 the next matched word in the modification sequence is selected as a sub-index and the process returns to step S23.

In the present example, in step S23 it is determined that there are context words. Thus in step S26 the context data for the second path level is selected i.e. any unmatched words linguistically related to the matched word camera by the paths mod and pmod:mod. In step S27 the data sets are grouped according to common context words (or the lack of context words) and they are indexed by the common context word. The results of sorting the data search using the context data for the example given above is illustrated below:

Camera
  large
    large camera with a lens
    large camera with a zoom lens
  [on a table]PP
    camera with a lens on a table
    camera with a long zoom lens on a table
  ( )
    camera with a lens In the above, the matched word (the head word) is shown in bold. ( ) means empty context: "camera with a lens" exactly matched the query and there is no context data in relation to camera.

In step S28 of FIG. 5 it is then determined whether there are any more path levels. If there are more path levels in step S29 the next path level is selected and step S27 is repeated to generate further sub-indexed groups of data sets. In the present example in step S28 it is determined that there are no more path levels and thus in step S25 the next matched word is selected as a sub-index. The next matched word in this example is the word "lens" and this is used as a sub-index for groups of more than one data sets. The process then returns to step S23 where in the present example it is determined whether there are context words to be processed and in step S26 the context for the second path level is selected. In step S27 the data sets are grouped according to the common context words and indexed accordingly. The result of this is illustrated below:

```
Camera
    large
        lens
            zoom
                large camera with a zoom lens
            ( )
                large camera with a lens
    [on a table]PP
        lens
            long & zoom
                camera with a long zoom lens on
                a table
            ( )
                camera with a lens on a table
            ( )
                camera with a lens
```

The result in step S30 is the storage of the hierarchical indexes and sub-indexes to which data sets belong. For example, the data set "large camera with a zoom lens" is indexed by camera:large:lens:zoom. A camera with a lens on a table is indexed by camera:[on a table]PP: lens: ( ).

This ordering of the data using the context data enables the data to be output to a user in a format which enables the user to more easily understand the context of the match.

A number of levels of context information depend upon the path levels used and the number of matched words. The number of contexts in each level will depend upon the context of the database being searched. For example, in the first level in the example given above there are, only two contexts: large and [on a table]PP. If there were further data sets e.g. red camera with a lens on a table, small camera with a lens on a table etc, the number of contexts in the first level would be greater.

A second embodiment to the present invention will now be described with reference to FIG. 6.

Figure 6:
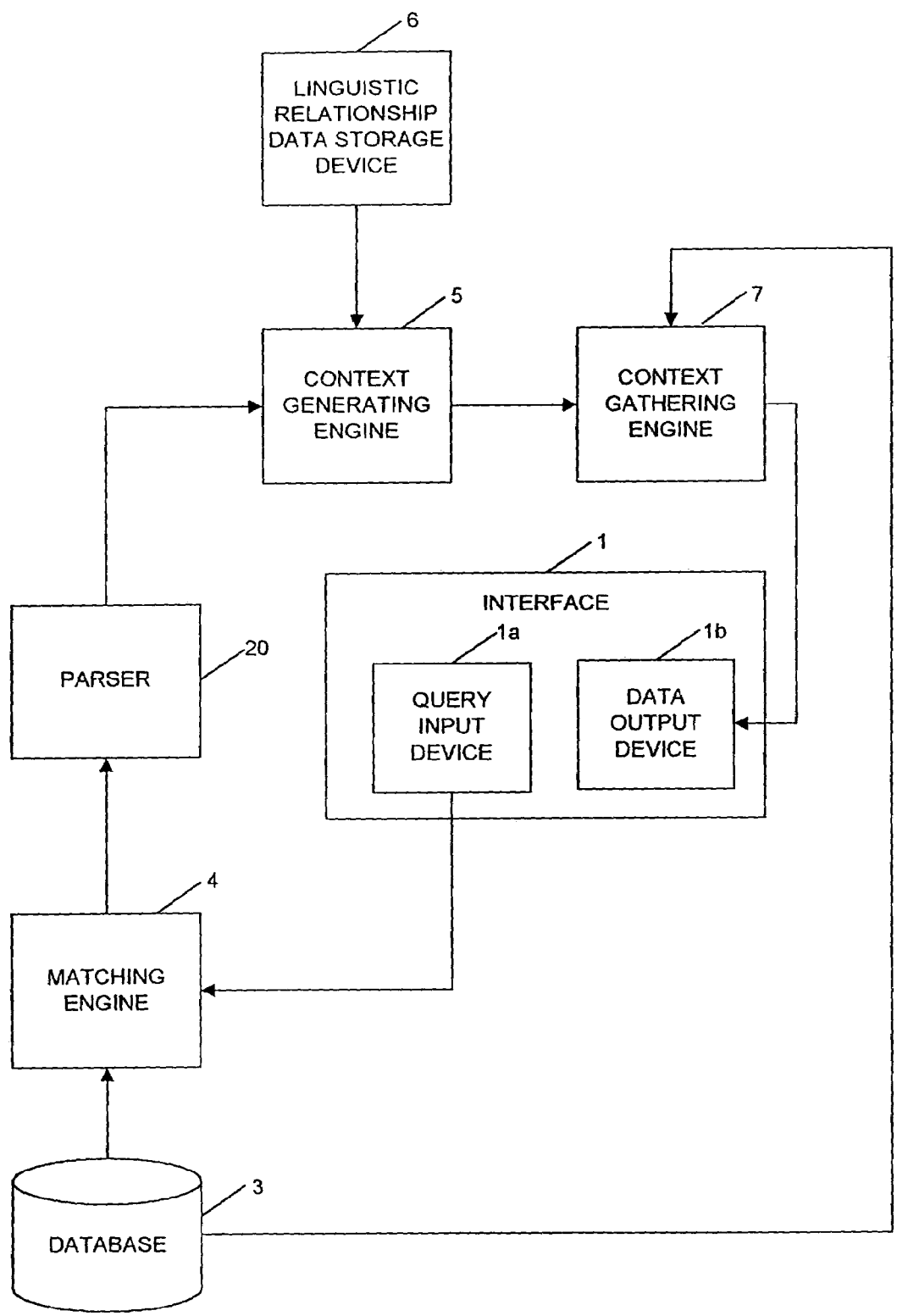
FIG. 6 is a functional diagram of another embodiment of the present invention.

FIG. 6 is a functional diagram of a second embodiment which has similar components to the functional diagram of the first embodiment illustrated in FIG. 1. The second embodiment differs from the first embodiment only in that the parser 2 of the first embodiment which receives the input query and the data sets from the database 3, is replaced with a parser 20 which parses the output of the matching engine 4. In this embodiment the matching engine will perform key word matching. The syntactic information required in order to generate the context data is obtained by the parsing operation of the parser 20 subsequent to the matching process. This embodiment benefits from a simpler matching process but suffers from lack of accuracy in the matching process because of the lack of syntactic information.

Although the present invention there has been described hereinabove with reference to specific embodiments, the present invention is not limited to these specific embodiments and modifications are possible within the scope of the invention as defined in the appendant claims.

In particular, the present invention is not limited to any particular type of matching process. The matching process needs only to identify words in the query which match words in the sets of data in the database.

In order to obtain the necessary syntactic information to enable the formation of context data, a level of parsing is required. Any form of parser which can provide some form of the syntactic information can be used in the implementation of the present invention. For example, the pure dependency parser can be used as disclosed in the paper entitled "Parsing English with a Link Grammar" by D Sleator and D Temperley (Carnegie Mellon University School of Computer Science, Technical Report No. CMEU CS 91 196, October 1991). In this system there is no phrase bracketing provided but parts of the algorithm that extract phrases could instead extract a sequence of words defined by having certain dependency links with matched terms. Parsers are disclosed in GB-A-2269923, EP-A-0737928, the paper by T Järvinen and P Tapanainen, and the paper by P Tapanainen and T Järvinen for example. Also, simpler parsing techniques could be used such as disclosed in the paper by S Flank.

The present invention is applicable to any form of searching technique and can be used with a wide range of search engines such as a web search engine and a database search engine. The output of such a search engine incorporating the present invention provides far more information to the user and allows the user to see the context of the results of the search.

Although the present invention has been described hereinabove as residing in a programmed multipurpose computer, the present invention can of course be implemented using specifically designed hardware such as a logic circuit.

The invention claimed is:

1. A computer implemented data processing method for processing data to enhance the results of a search for data in the form of units of a natural language, the method comprising:

receiving an input query in the form of units of the natural language and outputting a result in the form of output data;

searching for and identifying any matches between the units of the input query and units of the data using reference data from said database so as to identify matched units, and any unmatched units syntactically linked to the matched units and including a head unit which does not modify another unit;

parsing one or both of the input query and the output of the searching step to determine linguistic relationships between the units;

generating, where there are unmatched units in the query, context data in the form of one or more unmatched units of the reference data, in accordance with one or more rules defining contextually important modification relationships between matched and unmatched units, each unmatched unit having a predefined syntactic relationship to one or more of the matched units; and forming said output data as a layered hierarchical structure formed from said head unit of the input query, with said context data for said head unit forming one or more sublayers of said hierarchical structure, any further matched units forming further sublayers of said sublayers, the order of selection of said further matched units being dependent on their modification relationship within the input query and any said context data for said further matched units forming yet further sublayers, said sets of data being identified by a final said sublayer in the hierarchical structure, and generating display data from said output data representing said hierarchical structure whereby a user of the search is presented with a plurality of choices comprising the best matches to the input query ordered in accordance with the context data.

2. A method according to claim 1, wherein the predefined syntactic relationship is a predefined modification relationship.

3. A method according to claim 1, wherein the one or more rules contain syntactic and semantic constraints for the formation of the context data.

4. The method according to claim 1, wherein a query for retrieving desired information units containing units of a natural language for a plurality of available information units is received in said receiving step and the output data representing desired information units is output as the best matches and any respective said context data in said outputting step.

5. The method of claim 4, wherein the desired information units are output ordered by said context data.

6. A carrier medium carrying processor implementable instructions for controlling a processor to carry out the method of claim 1.

7. Search apparatus for searching a database for data in the form of units of a natural language, the apparatus comprising:

interface means for receiving an input query in the form of units of the natural language and for outputting the results of the search;

matching means for searching for and identifying any matches between the units of the input query and the units of the data using reference data from said database so as to identify matched units, any unmatched units syntactically linked to the matched units and including a head unit which does not modify another unit;

parsing means for parsing one or both of the input query and the output of the matching means to determine linguistic relationships between the units;

generating means for, where there are unmatched units in the query, generating context data in the form of one or more unmatched units of the reference data, each unmatched unit having a predefined syntactic relationship to one or more of the matched units, said generating means operating in accordance with one or more rules defining contextually important modification relationships between matched and unmatched units; and forming means for forming said output data as a layered hierarchical structure formed from said head unit of the input query, with said context data for said head unit forming one or more sublayers of said hierarchical structure, any further matched units forming further sublayers of said sublayers, the order of selection of said further matched units being dependent on their modification relationship within the input query, and any said context data for said further matched units forming yet further sublayers, said sets of data being identified by a final said sublayer in the hierarchical structure; and means for generating display data from said output data representing said hierarchical structure whereby a user of the search apparatus is presented with a plurality of choices comprising the best matches to the input query ordered in accordance with the context data.

8. Search apparatus according to claim 7, wherein the predefined syntactic relationship is a predefined modification relationship to the respective matched units.

9. Search apparatus according to claim 7, wherein said one or more rules contain syntactic and semantic constraints for the formation of the context data.

10. Data retrieval apparatus, including the search apparatus according to claim 7, for retrieving desired information units of a natural language from a plurality of available information units, the data retrieval apparatus comprising:

input means for inputting the query in units of the natural language; and output means for outputting the output data representing desired information units as the best matches and any respective said context data.

11. Data retrieval apparatus according to claim 10, wherein said output means is adapted to output the desired information units ordered by said context data.

* * * * *